May 23, 1967 J. W. SAXTON 3,320,772
CLUTCH DEVICE
Filed Nov. 12, 1964
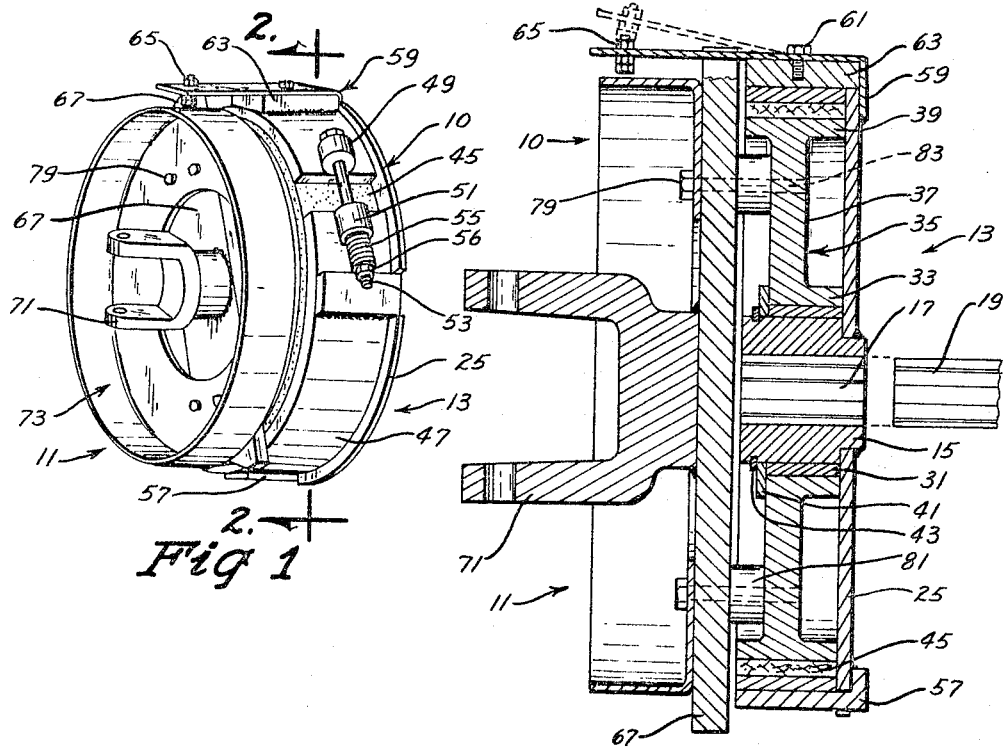
Fig. 1
Fig. 2
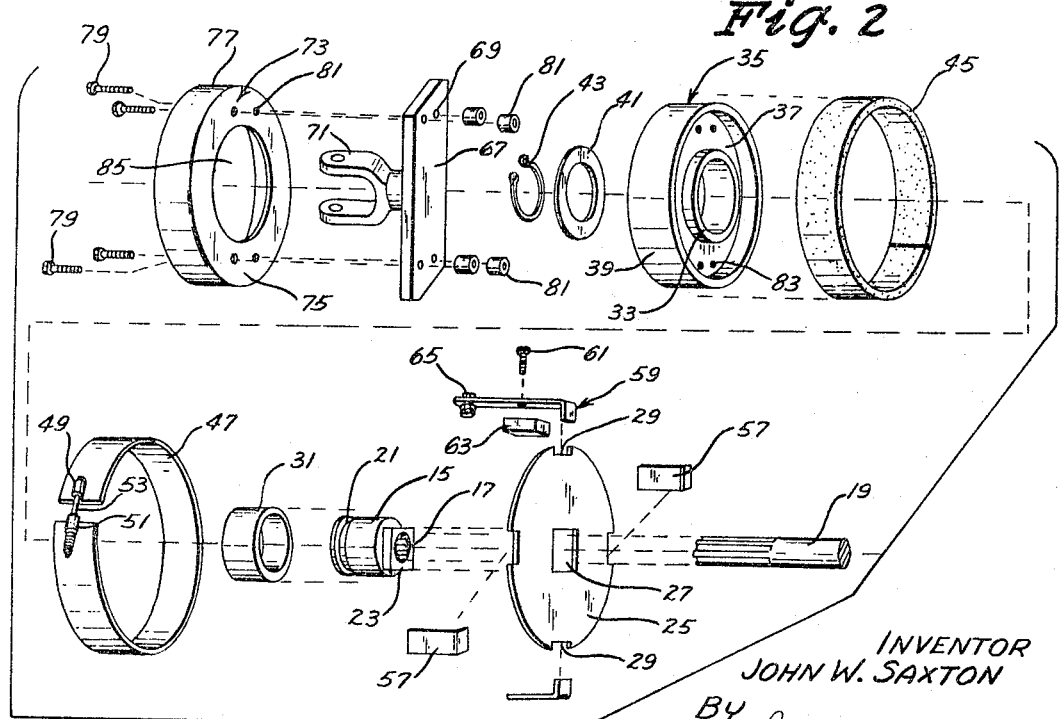
Fig. 3
INVENTOR
JOHN W. SAXTON
BY
Duck & Zarley
ATTORNEYS United States Patent Office 3,320,772
Patented May 23, 1967

3,320,772
CLUTCH DEVICE
John W. Saxton, Fort Dodge, Iowa, assignor to The Standard Engineering Company, Fort Dodge, Iowa
Filed Nov. 12, 1964, Ser. No. 410,677
7 Claims. (Cl. 64—30)

This invention relates to a clutch and more particularly to a slip clutch wherein the resistance to slippage thereof can be selectively adjusted.

Slip clutches are commonly interposed in the drive means between a tractor and a farm implement. The most common type of slip clutch is the ratchet type wherein opposing plates having ratchet teeth formed therein are placed under tension face-to-face. These clutches have proven to be entirely unsatisfactory. It is impossible to provide a slip clutch of this type which will not slip when a substantial amount of torque is applied thereto.

A further type of slip clutch which is sometimes utilized in the drive means between a tractor and a farm implement is of the disk type wherein two disks are placed together under tension face-to-face. These disk type clutches have also proven to be entirely unsatisfactory due to the fact that it is impossible to detect when there is slippage therebetween which frequently causes the clutch to be burned out.

Therefore, it is a principal object of this invention to provide a slip clutch wherein the resistance to slippage thereof can be selectively adjusted.

A further object of this invention is to provide a slip clutch which will not slip when substantial amounts of torque are applied thereto.

A further object of this invention is to provide a slip clutch wherein the resistance to slippage can be preset.

A further object of this invention is to provide a slip clutch utilizing peripheral contact between opposing members rather than face-to-face contact.

A further object of this invention is to provide a slip clutch wherein a warning device is secured thereto which warns the operator of slippage of the clutch to prevent the wearing of the same.

A further object of this invention is to provide a slip clutch wherein the clutch lining material can be readily replaced.

A further object of this invention is to provide a slip clutch which utilizes a minimum number of moving parts.

A still further object of this invention is to provide a slip clutch which is economical of manufacture, durable in use and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings, in which:

FIG. 1 is a perspective view of the assembled slip clutch;

FIG. 2 is a sectional view of the device seen on line 2—2 of FIG. 1 at an enlarged view; and FIG. 3 is an exploded perspective view of the device.

The numeral 10 generally designates the cutch device seen in the drawings having a forward or input end 11 and a rearward or output end 13.

The numeral 15 designates a cylindrical hub having a bore 17 extending therethrough which is adapted to receive an output shaft 19 having a splined forward end. Hub 15 is provided with a groove 21 in its periphery adjacent its forward end as seen in FIG. 3. The rearward end of hub 15 is provided with a substantially square portion 23 extending rearwardly therefrom as seen in FIG. 3.

A disk shaped backing plate 25 having a square central opening 27 is secured to hub 15 by means of square portion 23 extending through central opening 27 and being welded to the rearward side of backing plate 25 as seen in FIG. 2.

A bushing 31 rotatably embraces hub 15 between groove 21 and square portion 23. Hub portion 33 of wheel 35 is press fitted onto bushing 31 and so that the rearward end of hub 33 is adjacent the forward side of backing plate 25 as seen in FIG. 2. Extending radially outwardly from hub portion 33 is a flange portion 37 which terminates at its outer end in a rim portion 39.

A washer 41 embraces hub 15 forwardly of bushing 31 and hub portion 33 of wheel 35. A snap ring 43 engages groove 21 of hub 15 to maintain bushing 31, wheel 35 and washer 43 on hub 15.

A clutch lining 45 embraces rim portion 33 of wheel 35 as seen in FIG. 2. A split band member 47 embraces clutch lining 45 and has collar members 49 and 51 secured to its ends by welding or the like. A bolt member 53 extends through collars 49 and 51 and has a spring member 55 embracing its outer end and has a nut 56 threadably mounted thereon.

A plurality of L-shaped brackets 57 are secured to the rearward side of backing plate 25 adjacent notches 29 by means of welding. Each of brackets 57 extend through a notch 29 and pass over the outer periphery of split band 47 where they are secured thereto by means of welding or the like. An L-shaped clapper 59 is secured to the rearward side of backing plate 25 and extends through a notch 29 over band member 47 and in a spaced relationship thereto. A bolt member 61 threadably extends downwardly through clapper 59 into spacing member 63 as seen in FIG. 2. The outer end of clapper 59 is provided with a bolt means 65 extending therethrough as seen in the drawings.

An elongated, flat clapper activator 67 having cam surfaces on its opposite ends is secured to the forward side of flange portion 37 of wheel 33 in a manner to be described hereinafter. Clapper activator 67 is provided with a plurality of holes 69 extending therethrough as seen in FIG. 3. Secured to the forward central portion of clapper activator 67 by means of welding is a yoke portion 71 of a conventional universal joint.

A cup shaped bell 73 having a base portion 75 and a rim portion 77 extending transversely from the outer edge thereof is secured to the forward end of clapper activator 67 by means of bolt members 79 extending through holes 81 in base portion 75, through holes 69 in clapper activator 67, through spacers 81 and into threaded holes 83 in flange portion 37 of wheel 35.

It should be noted that clapper activator 67 has a length greater than the diameter of band 47 so that the outer ends of clapper activator 67 extends sufficiently outwardly therefrom to engage clapper 59. It should also be noted that base portion 75 of bell 73 is provided with a central opening 85 to enable yoke 71 to extend therethrough.

Clutch lining 45 is constructed of a woven brake lining material. All of the remaining parts of the device, with the exception of bushing 31 which is constructed of bronze, may be constructed of any suitable material such as iron or steel.

The normal method of operation is as follows. The clutch 10 would normally be mounted on a farm implement such as a shredder or the like so that yoke 71 is operatively connected to a power means such as a tractor power-take-off. Hub 17 would normally be mounted on an output shaft 19 having its outer end splined as seen in the drawings.

Assuming that band 47 has been previously tightened to a predetermined position by means of bolt 53, etc., the power-take-off would be activated to cause the rotation of clutch 10 in a clock-wise direction as viewed from its forward side in FIG. 1. The rotation of yoke 71 causes clapper activator 67 to also rotate due to the rigid connection therebetween. The rotation of clapper activator 67 causes wheel means 35 and bell 73 to also rotate due to bolts 79 extending therethrough. The rotation of wheel 33 will normally cause band 47 to rotate due to the frictional engagement between the outer surface of rim portion 39, clutch lining 45 and the inner surface of band 47. The rotation of band 47 causes backing plate 25 to be rotated due to brackets 57 being secured to band 47 and to backing plate 25. The rotation of backing plate 25 causes hub 17 to be rotated due to the rigid connection therebetween. The rotation of hub 17 obviously causes shaft 19 to be rotated which in turn provides power to the moving parts of a farm implement.

Should the implement become clogged or jammed, shaft 19 will resist rotation thereof. If this resistance overcomes the force necesary to cause slippage between rim portion 39, clutch lining 45 and band 47, such slippage will occur. Therefore, shaft 19, hub 17, backing plate 25 and band 47 will seize to rotate thereby preventing damage to the implement while yoke 71, bell 73 and clapper activator 67 will continue to rotate. The continued rotation of these parts will cause wheel 33 and bushing 31 to rotate about hub 17.

As each of the cammed outer ends of clapper activator 67 rotates past clapper 59, clapper activator 67 will cause clapper 59 to be raised to the position shown in broken lines in FIG. 2. As soon as the end of clapper activator 67 rotates out of engagement with clapper 59, the resiliency of clapper 59 causes it to return to its original position and slightly therepast thereby causing the inner end of bolt means 65 to strike rim portion 77 of bell 73 thereby causing a loud noise. This loud noise alarms the operator to the fact that the device is slipping and he will immediately stop the tractor to prevent damage to the clutch and to the other parts of the machinery.

It should be noted that clutch 10 works equally as well without bell 73 and clapper 59. However, the operator will possibly not detect slippage of the device when these parts are omitted.

The parts of the device are inexpensive and easy of manufacture as previously described. The clutch lining 45 is constructed of a woven brake lining material and can be easily replaced as the need occasions.

When initially adjusting the device, the operator would normally loosen bolt 53 so that the device would freely slip. The band 47 would then be progressively tightened during actual field operation until the implement satisfactorily performed its function without slippage of the device. Thus, as soon as an obstruction or the like was encountered, the device would slip thereby preventing damage to the implement.

It has been found that oils or the like when inadvertently coming into contact with lining material 45 do not cause undesirable slippage of the device but rather causes the lining to resist slippage thereof to a higher degree.

The peripheral type of frictional engagement described herein between band 47, lining 45 and rim portion 39 permits the clutch to resist slippage in greater amounts than is possible with the face-to-face type of frictional engagement employed by the heretofore clutches.

Thus, from the foregoing, it can be seen that the device accomplishes all of its stated objectives.

Some changes may be made in the construction and arrangement of my clutch device without departing from the real spirit and purpose of my invention, and it is my intention to cover by my claims, any modified forms of structure or use of mechanical equivalents which may be reasonably included within their scope.

I claim:
1. In a clutch device,
   a hub means having a cylindrical portion, a groove formed in said cylindrical portion adjacent to one end of said hub means, a disc shaped backing plate operatively secured at its center to the other end of said hub means,
   a cylindrical bushing rotatably embracing said hub means between said backing plate and said groove,
   a wheel means having a central portion embracing said bushing and a flange portion extending radially outwardly therefrom which terminates in a rim portion disposed at a right angle thereto,
   a snap ring in said groove to maintain said bushing and said wheel means on said hub means,
   a lining means yieldably rotatably embracing said rim portion,
   an adjustable split band means yieldably rotatably embracing said lining means,
   means rigidly connecting said split band and said backing plate,
   said hub means being adapted to be operatively connected to an output drive means,
   said wheel means being adapted to be operatively connected to an input drive means.
2. The device of claim 1 wherein said adjustable split band means includes a tightening means operatively connected thereto for tightening said split band on said lining means.
3. The device of claim 1 wherein a noise making means is operatively secured to said wheel means and said split band means; said noise making means being adapted to be activated when said wheel means is rotated with respect to said split band means.
4. The device of claim 1 wherein a cam plate having cam surfaces on its opposite ends and a bell means are secured to the input side of said wheel means; a clapper means secured to said split band which is in the rotational path of said cam surfaces on the outer ends of said cam plate when said cam plate and said wheel means are rotated with respect to said split band means and said clapper means; said cam plate engaging said clapper means and causing said clapper means to strike said bell means when said wheel means is rotated with respect to said split band means.
5. The device of claim 4 wherein said bell means is comprised of a cup-shaped member having a disc-shaped base portion which terminates at its peripheral edges in a flange portion extending transversely therefrom.
6. The device of claim 4 wherein said clapper means is comprised of an elongated resilient arm member which is secured to said split band means and which has a striker assembly secured to one of its ends which is adapted to strike said flange portion of said bell means at times.
7. In a clutch device,
   a hub means including a cylindrical portion having opposite ends,
   a plate means secured at its center to one end of said cylindrical portion, a wheel means operatively rotatably mounted on said cylindrical portion and having a peripheral rim portion, means maintaining said wheel means on said hub means, a lining means embracing said rim portion, an adjustable split band means yieldably rotatably embracing said lining means, means rigidly connecting said split band means and said plate means, said hub means being adapted to be operatively connected to an output drive means, said wheel means being adapted to be operatively connected to an input drive means.

References Cited by the Examiner

UNITED STATES PATENTS

| | | | |
|---|---|---|---|
| 918,562 | 4/1909 | Lauson | 192—80 |
| 1,371,719 | 3/1921 | Alber | 64—30 |
| 1,596,132 | 8/1926 | Waite | 64—30 |
| 1,601,438 | 9/1926 | Gustafson | 64—30 |
| 2,411,600 | 11/1946 | Spase | 64—30 |
| 2,472,925 | 6/1949 | Spase | 64—30 |
| 2,597,514 | 5/1952 | Nash | 64—30 |
| 2,789,420 | 4/1957 | Madden | 64—30 |

FRED C. MATTERN, JR., *Primary Examiner.*

HALL C. COE, *Examiner.*